Jan. 12, 1971  I. B. WEINSTOCK  3,554,805
SEALED RECHARGEABLE BATTERY HAVING A SENSING ELECTRODE
Filed Aug. 22, 1968
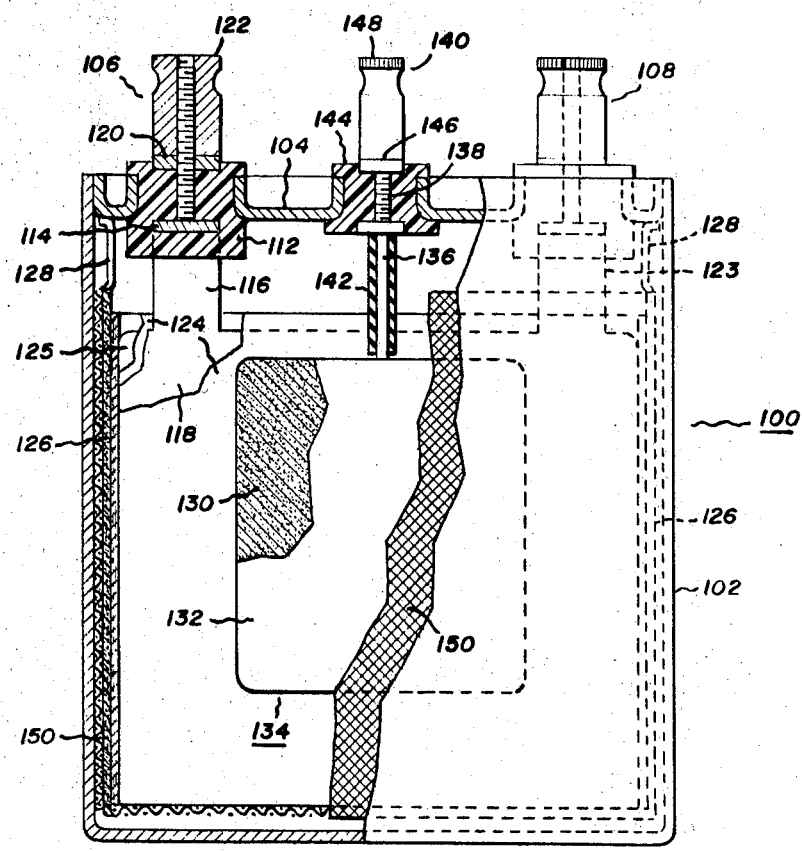
INVENTOR:
IRWIN B. WEINSTOCK
BY John P. Taylor
HIS ATTORNEY.

United States Patent Office 3,554,805
Patented Jan. 12, 1971

3,554,805
SEALED RECHARGEABLE BATTERY HAVING A SENSING ELECTRODE
Irwin B. Weinstock, Gainesville, Fla., assignor to General Electric Company, a corporation of New York
Filed Aug. 22, 1968, Ser. No. 754,654
Int. Cl. H01m 35/00, 1/06
U.S. Cl. 136—3
4 Claims

ABSTRACT OF THE DISCLOSURE

An improved sealed rechargeable cell unit is provided having a sensing electrode which delivers an electrical signal quantitatively indicative of oxygen partial pressure within the cell. The signal can then be connected to suitable current monitoring means which can include a charge rate controller to control the rate of charging to inhibit excessive evolution of gas within the cell.

My invention relates to a novel sealed cell unit capable of rapid charge and to a novel charging arrangement.

The invention described herein was made in the performance of work under a NASA contract and is subject to the provisions of section 305 of the National Aeronautics and Space Act of 1958, Public Law 85–568 (72 Stat. 435; 42 U.S.C. 2457).

In the construction of sealed rechargeable cell units it is conventional practice to form the cells with the positive electrode either precharged or of reduced capacity with respect to the negative electrode so that the positive electrode approaches full charge prior to the negative electrode. Upon nearing full charge the positive electrode evolves oxygen gas. If the charge rate is not too high, the negative electrode will consume the oxygen gas as quickly as it is formed and in the process of consumption be proportionately discharged. Thus, a sealed cell unit may be charged indefinitely at a low charge rate without excessive internal pressurization, since the oxygen gas evolved by the positive electrode is continuously consumed by the negative electrode and in the process the negative electrode is maintained below full charge so that no hydrogen gas is evolved.

The desirability of having sealed cell units that can be more rapidly charged without internal pressure buildup has been long appreciated. One approach to increasing charge rates has been to incorporate an oxygen recombination electrode in a sealed cell unit so that as oxygen is evolved by the positive electrode it can be more rapidly consumed. The recombination electrode is typically electrically connected to the negative electrode so that the latter in acting as a counter electrode is maintained at less than full charge.

While recombination electrodes consume oxygen faster than negative electrodes, the tendency of recombination electrodes to saturate at relatively low oxygen partial pressures has limited maximum charge rates safely obtainable. For example, typically a sealed cell unit containing a recombination electrode is initially charged at a rapid charge rate until the current between the recombination and negative electrodes reaches a predetermined level, at which time charging is either terminated or dropped to a low level. The disadvantage is that the current flowing between the recombination and negative electrodes approaches a maximum while the cell internal pressure is still at a relatively low level. Accordingly, the sealed cell unit through a disproportionately large portion of the charge cycle is held to a relatively low rate. The problem of premature reversion to low charge rate is further aggravated where the sealed cell unit is being charged under conditions that tend to induce oxygen evolution of the positive electrode well in advance of full charge, such as charging at elevated temperatures.

It is an object of my invention to provide a novel sealed rechargeable cell unit capable of being safely and reliably charged at a more rapid rate.

It is another object to provide an arrangement for rapidly charging a sealed cell unit in a controlled manner.

These and other objects of my invention are accomplished in one aspect by providing a rechargeable sealed cell unit comprised of sealed housing means defining an interior chamber including insulatively spaced electronically conductive portions forming positive and negative terminal means for the sealed cell unit. Rechargeable positive and negative plate means are located within the interior chamber. Means separately electronically connect the positive and negative plate means to the positive and negative terminal means, respectively. Porous separator means electronically insulate the positive and negative plate means from contact. An electrolyte contained within the porous separator means ionically conductively communicates the positive and negative plate means. Oxygen recombination electrode means may, if desired, be provided having a major surface contacting the porous separator means in ionically conductive relation with the electrolyte and a remaining major surface exposed to a gas containing zone of the interior chamber. Sensing means are provided for generating and delivering a signal quantitatively of oxygen partial pressure within the gas containing zone. The sensing means include oxygen reduction means for withdrawing gaseous oxygen from the gas containing zone having one major surface in contact with the separator means and the electrolyte. The oxygen reduction means includes a nickel oxide surface coating. Non-porous hydrophobic polymer film means is adhered to a remaining major surface of the oxygen reduction means and has a major surface exposed to the gas containing zone for limiting the rate of oxygen diffusion therethrough from the gas containing zone to the oxygen reduction means as a function of oxygen partial pressure to a rate below the maximum oxygen withdrawal capability by the oxygen reduction means. By connecting the signal generated by the sensing means through suitable current monitoring means, the oxygen partial pressure within the cell can be determined and the charging rate adjusted accordingly.

My invention may be better understood by reference to the following detailed description considered in conjunction with the drawing, which is an elevation of a sealed cell unit constructed according to my teaching, with portions broken away.

Noting the figure, a sealed cell unit 100 is illustrated constructed according to my invention. The cell unit is provided with a casing 102 having a closure 104 sealingly joined thereto. Negative and positive terminal assemblies 106 and 108, respectively, are sealingly fitted to the closure. Noting terminal assembly 106, the terminal post is mounted with its lower end sealed in insulative spacer 112 molded to the closure in sealing relation therewith. The terminal post is electrically connected at 114 to the current collector strips 116 of negative plates 118. A seating ring 120 is partially embedded in the upper surface of the spacer and a thumb nut 122 is removably threaded to the upper end of the terminal post. The positive terminal assembly is identical to the negative terminal assembly, but is connected to current collectors 123 of the positive plates 125. As is conventional practice, the positive and negative plates are interleaved and insulated from contact by porous separator material 124, which also surrounds the exterior periphery of the plates. The separator material is porous and holds electrolyte therein by capillarity to provide ionic conduction between the plates.

Oxygen recombination electrodes 126, if desired, are located at each end of the positive and negative plates. The recombination electrodes are mounted with one major surface in contact with the separator material (and the electrolyte contained therein) which surrounds the portion of the end portions of the positive and negative plates.

A porous oxygen reduction substrate 130 is mounted with one major surface in contact with electrolyte-containing separator material overlying the face of the adjacent negative plate 118. The remaining major surface of the oxygen reduction substrate is entirely covered by a firmly adhered non-porous film 132 (a portion of the film being broken away in the figure merely to expose the substrate to view). The substrate and film together form a sensing electrode 134. A connector strip 136 electrically connects the substrate to a terminal post 138 of a sensing electrode terminal assembly 140. The connector strip is provided with an electrically insulating sleeve 142. The lower end of the sensing terminal assembly is sealingly joined to the closure and insulatively spaced therefrom by insulative spacer 144. A seat ring 146 is imbedded in the upper surface of the spacer while a thumb nut 148 is removably attached to the upper end of the terminal post 138.

From the foregoing description it is apparent that the casing, closure and terminal assemblies sealingly cooperate to form a sealed housing for the cell unit defining an interior chamber within which the positive, negative, recombination, if desired, and sensing electrodes are contained. The portion of the interior chamber not occupied by the electrodes, the separator material, the associated electrolyte, and various connecting strips is occupied by air at the time the cell is assembled and is hereinafter referred to as the gas containing zone of the interior chamber. To allow the outer major surfaces of the recombination electrodes and the sensing electrode to be freely accessible to the gas within the housing a coarse screen 150 formed of electrically insulative material is interposed between the outer surfaces of these electrodes and the interior surface of the casing. The screen is formed with large openings to minimize any capillary attraction for the electrolyte within the separator material.

The positive and negative plates as well as the separator material may be chosen from among those conventionally employed in sealed rechargeable cell units. The electrolyte may be any conventional aqueous electrolyte, whether acid or base. For example, where the sealed cell unit is constructed with nickel or silver positive plates and cadmium or zinc negative plates the electrolyte is typically 5 to 9 N potassium or sodium hydroxide. The sealed cell unit may, alternatively, be a rechargeable lead-acid cell having lead and lead oxide plates with sulfuric acid as the electrolyte.

The oxygen recombination electrode may take the form of any conventional oxygen recombination or fuel cell electrode useful with an aqueous or ion exchange electrolyte. An efficient fuel cell electrode that may be used as an oxygen recombination electrode with or without a porous hydrophobic gas side coating is disclosed by Niedrach in Pat. No. 3,297,484, issued Jan. 10, 1967 and assigned to the assignee of this application. For operation of the sealed cell unit below 0° C., it is preferred to form the recombination electrode of a porous sintered metal plaque loaded with an electrocatalyst. Such electrodes are fully disclosed by Jones in patent application Ser. No. 691,314, filed Dec. 18, 1967, and assigned to the assignee of this application, the disclosure of which is here incorporated by reference. For example, in testing sintered metal plaque recombination electrodes having a plaque porosity of 85% at a temperature of $-25°$ C., a decline in electrode polarization of approximately 0.2 volt was noted at a current density of 100 ma./cm.$^2$ as compared with polytetrafluoroethylene-bonded electrodes containing comparable electrocatalyst loadings, although tests at ambient temperatures showed comparable performance. In the construction of sealed cell units according to my invention intended to be operated at temperatures below 0° C. it is accordingly preferred to employ sintered metal plaque recombination electrodes in which the plaque has a porosity in the range of from 70 to 90 percent.

My sensing electrode is of novel and improved construction. Carson in patent application Ser. No. 754,576, filed concurrently herewith, the disclosure of which is here incorporated by reference, teaches the construction of substrates for sensing electrodes employing materials such as nickel, cobalt, gold, spinel, carbon, the platinum triad metals—that is, materials which are oxidatively stable in the environment of use and which exhibit some capability for oxygen reduction. I have discovered that superior substrates are those possessing a nickel oxide surface layer. Of the various substrates tested by Carson, those formed of sintered nickel plaque were noted to yield linear responses over a wider range of operating and cell construction parameters than other substrate materials. In all instances responses were near linear. I have discovered that by oxidizing the surface of a nickel substrate, the control of signal level at any given pressure level can be improved and a signal of greater strength than obtainable with unoxidized nickel plaque can be achieved. This is accomplished without disturbing the linearity of signal response or introducing any known functional disadvantage. Where the nickel oxide surface layer is formed on a nickel substrate this may be conveniently accomplished merely by oxidizing the nickel substrate in any known manner. Preferably, the oxidation is carried out by converting the nickel surface to a salt and then oxidizing the nickel salt. It has been found that a more uniform oxide coating can be achieved in this manner than by direct oxidation of the metallic nickel. Uniform oxidation can be readily achieved for example by treating the nickel substrate with a complexing agent, such as glycine, nitric acid, sodium hypochlorite, and thereafter increasing the temperature of the substrate in the range of from approximately 300° C. to 450° C. to convert the so formed nickel respective salt to the oxide. The thickness of the layer of surface oxidation does not appear to be critical. I have noted that the advantages of my invention are achieved whenever sufficient nickel oxide is present on the substrate surface to impart a visually discernable brown coloration characteristic of nickel oxide. It is, of course, possible to apply nickel oxide coatings to substrates other than nickel. In such instances the substrate metal acts merely as a current collector for the sensing electrode and may be chosen of any oxidatively stable, electronically conductive metal.

As previously described, one major surface of the porous substrate is in contact with the separator material for intimate contact with the cell electrolyte. The remaining major surface is masked from the oxygen-containing zone of the interior chamber by a non-porous hydrophobic polymer film adhered thereto. Fluorocarbon polymers are preferred since they are highly hydrophobic and at the same time allow oxygen diffusion therethrough at relatively high rates. Exemplary suitable fluorocarbon polymers include polyhexafluoropropylene, polyvinylidene fluoride, polychlorotrifluoroethylene, polytetrafluoroethylene (hereinafter, PTFE). Of the fluorocarbon polymers PTFE is preferred because of its high hydrophobicity and high oxygen permeability. The hydrophobic character of the film is desired to minimize electrolyte wetting the surface, which could otherwise result in misleadingly low sensing electrode signals, since the oxygen diffusion path to the substrate could be proportionately increased by surface electrolyte. A high permeability for oxygen is desirable for allowing the use of thicker films to achieve a given diffusion rate and thereby reducing the chances of pin holes or similar discontinuities that must be guarded against with very thin films.

The film is firmly adhered to the surface of the substrate to prevent lateral oxygen migration to the substrate along its interface with the film, as would occur if the film were merely laid against the substrate. A preferred procedure for attaching the film to the substrate is to press the film against the substrate at an elevated temperature below the sintering temperature of the polymer. For example, with PTFE films, satisfactory bonding has been obtained with pressures in the range of from 8,000 to 12,000 p.s.i. at temperatures of from 350 to 360° C. for 40 minutes. It is recognized that bonding temperatures and pressures as well as press residence times are interrelated parameters subject to considerable variation. The film is formed pore free to maintain the maximum level of oxygen diffusion to a level below the maximum capability of the substrate to reduce oxygen. Oxygen diffusion rates within the ordinary operating pressure ranges of sealed cell units, 5 to 30 p.s.i.a., are directly proportional to the area of the electrode and to the pressure differential across the film and inversely proportional to the film thickness. It is preferred that the sensing electrode film have an oxygen diffusion rate of from $10^{-10}$ to $10^{-8}$ moles/sec. for each square centimeter of sensing electrode surface and for each pound per square inch of pressure within the cell.

The utilization of my invention is described with reference to cell 100. For ease of description it is assumed that the cell 100 is initially in the discharged state and that the pressure level within the interior chamber of the cell housing approximates that exterior of the housing. A high rate charger may be connected between the positive terminal assembly 108 and the negative terminal assembly 106. The recombination electrodes 126 are noted to be electrically connected to the cell housing through connector strips 128. The recombination electrodes are then connected to the negative plates by providing an electrical connection between the housing and the negative terminal assembly, preferably through a current limiting resistance (not shown). Alternatively the recombination electrodes can be internally connected directly to the negative terminal through a current limiting resistance (located within the cell) eliminating the connection to the housing.

The sensing terminal assembly 140 is connected to the negative terminal assembly through suitable current monitoring means (not shown). In a simple form the sensing and negative terminals may be connected through an ammeter, which may be directly calibrated in p.s.i., so that the charge current can be reduced to maintain the sealed cell unit within predetermined pressure limits merely by consulting the ammeter.

As the sealed cell unit is charged at a high rate some quantity of oxygen may be evolved. Initially the rate of oxygen evolution is well below the saturation level of the recombination electrodes 126. Since the recombination electrodes are capable of withdrawing oxygen from the gas containing zone of the interior chamber at a faster rate than it is formed, significant pressure increase within the sealed cell unit does not initially occur. The sensing electrode concurrently reduces a comparatively small fraction of the oxygen, but without an increase in oxygen partial pressure within the interior chamber the current between the sensing and negative electrodes remains at a base level.

As the sealed cell unit approaches full charge, oxygen evolution by the positive plates 125 accelerates to the extent that the recombination electrodes can no longer consume the oxygen at a sufficient rate to avoid rise of the oxygen partial pressure within the interior chamber. The rate of oxygen diffusion through the non-porous film 132 and of oxygen reduction by the substrate 130 increase in proportion to the increase in oxygen partial pressure. The film functions to feed oxygen to the substrate at a rate below the maximum capability of the substrate for oxygen reduction. Accordingly, the current between the negative and sensing electrodes remains proportional to the interal pressure level of the sealed cell unit even at maximum operating pressure levels. This is in marked contrast to the current flowing between the negative and recombination electrodes, which reaches a maximum or saturation level at an internal pressurization well below the maximum working pressure level.

The value of the current between the sensing and negative electrodes provides a convenient check on the internal pressure of the sealed cell unit, permitting a rapid charge rate to be utilized safely until the cell reaches a working pressure level very nearly approaching the maximum permissible internal pressure level. Slow rate charging—that is, charging at a rate which causes oxygen evolution at a slower rate than oxygen can be withdrawn by the recombination electrodes—is then curtailed sharply in duration or may be eliminated completely. The oxygen recombination electrodes continue to withdraw oxygen from the gas containing zone of the interior chamber after charging is terminated, so that by the time the sealed cell unit is discharged in use, the internal pressure level is again well below its maximum permissible value allowing rapid charging to be safely repeated on successive charge-discharge cycles.

To illustrate the practice of my invention several nickel-cadmium sealed cell units were constructed similar to sealed cell unit 100. Each cell unit was provided with eleven negative plates, ten positive plates, woven nylon separator material, and 31 percent by weight potassium hydroxide electrolyte, as is conventional practice. The cell units were sized to yield a nominal 6 ampere-hour capacity. Each cell unit incorporated two 1.5 by 5.0 centimeter recombination electrodes formed of sintered nickel plaque having a thickness of 11 mils and a porosity of 85.4 percent. The plaque was loaded with 5.0 mg./cm.$^2$ platinum black and provided with a 1.20 mg./cm.$^2$ porous surface coating of PTFE according to the technique described in the Jones patent application, noted above. The sensing electrode for each cell unit was 9.8 cm.$^2$.

The sealed cell units were tested to establish their suitability for an application requiring a 90 minute charge-discharge cycle—60 minutes on charge and 30 minutes on discharge. From the tests it was established that the sealed cell units were capable of sustaining a depth of discharge of up to 75 percent during each charge-discharge cycle with cell temperatures being varied from −20° to 40° C. It was found that internal pressurization of the sealed cell units could be maintained below 30 p.s.i.a.

Comparison of PTFE bonded platinum recombination electrodes of the type disclosed by the Niedrach patent, noted above, with plaque based recombination electrodes showed comparable performance at ambient temperatures and above, but plaque based recombination electrodes were noted to be markedly superior at temperatures below 0° C., presumably due to the larger pore sizes allowing greater oxygen diffusion at these lower temperatures.

A number of different sensing electrodes were tested and found to yield current responses directly related to internal pressure levels. In most instances the current responses of the sensing electrodes yielded linear or near-linear responses. For example, sensing electrodes were constructed of 20 mil thick porous nickel plaque having 4 to 7 micron pores, and 80 percent porosity variously covered with non-porous PTFE films 1 mil, 0.5 mil, and 0.25 mil in thickness. The one mil thick films were joined to the substrate using 12,000 p.s.i.g. at 672° F. for about 45 minutes; the 0.5 mil films were joined using 8,000 p.s.i.g. at 672° F. for about 60 minutes; and the 0.25 mil films were joined using 6,000–8,000 p.s.i.g. at 672° F. for about 60 minutes. Aluminum foil disks used to prevent the films from adhering to the press platen were dissolved in potassium hydroxide. It was observed that linear or near-linear responses were obtainable throughout the desired operating pressure range of from 5 to 30 p.s.i.a. and a temperature range of from −10 to 35° C. The resistances between the sensing and negative terminals were varied from 10 to 200 ohms. In some cells the size of the sensing electrode was reduced to 0.86 square centimeter. Linear and near-linear responses were also noted with these reduced area sensing electrodes. Extended operation for periods of over 750 charge-discharge cycles was obtained after which cycling was terminated with the cell units still exhibiting satisfactory end of discharge potentials, that is, above 0.8 volt.

A portion of the nickel plaques were provided with a nickel oxide surface layer prior to adhering the non-porous hydrophobic film. This was accomplished by cutting the plaque into 2.125 inch diameter disks which were soaked in a solution of 100 grams of glycine (aminoacetic acid) in 2 liters of water for 10 minutes at 70° C. After removal from the complexing solution the disks were blotted with filter paper and allowed to air dry for 45 to 60 minutes. Conversion to the oxide was accomplished by exposing the treated disks to air at approximately 400° C. for 10 minutes and then allowing the disks to cool. Upon removal from the oven the disks were noted to exhibit the brown coloration characteristic of nickel oxide.

For purposes of comparison, cell units were constructed with nickel oxide coated substrates in the sensing electrodes and otherwise identical cell units were formed with untreated nickel substrates in the sensing electrodes. It was found that the nickel oxide substrate containing sealed cell units yielded stronger signals at comparable pressure levels and that there was less variation in signal level from cell unit to cell unit. For example, with unoxidized nickel substrates signal voltages of from 150 to 300 millivolts were noted at 50 p.s.i.a., whereas with oxidized nickel substrates the signal voltages of the cell units ranged from 300 to 400 millivolts at the same pressure. This indicated that the substrates having nickel oxide coatings produced larger signal responses and were more nearly uniform from cell unit to cell unit, allowing for easier calibration to fixed signal level. The signal levels were noted using a 10 ohm resistance in the sensing electrode to negative electrode interconnection.

While I have described my invention with reference to a preferred embodiment, the sealed cell unit 100, it is appreciated that my invention may be practiced with any conventional rechargeable sealed cell unit having an aqueous electrolyte and is not limited to the specific cell construction described. For example, my invention may be applied to sealed cell units in which a plurality of cells are contained in a common sealed housing so that a common gas containing zone is defined. The positioning of the sensing electrode within the interior chamber may be varied as desired so long as the electrode is mounted with one major face in contact with the gas containing zone of the interior chamber. For example, in a cell construction having spiral wound plates rather than flat plates it may be desirable to locate the sensing electrode interiorly of the spiral wound plates. Either the sensing or negative electrodes may be directly attached to the cell housing. Alternately, all may be provided with separate terminals. Still other modifications will readily occur to others skilled in the art having knowledge of my invention. It is accordingly intended that the scope of my invention be determined by reference to the following claims.

What I claim and desire to secure by Letters Patent of the United States is:

1. A rechargeable sealed battery cell comprised of sealed housing means including insulatively spaced electronically conductive portions forming positive, negative and sensing terminal means for said unit, rechargeable positive and negative plate means within said housing means, means separately electronically connecting said positive and negative plate means to said positive and negative terminal means, respectively, electrolyte-containing porous separator means electronically insulating said positive and negative plate means, an electrolyte contained within said porous separator means ionically conductively communicating said positive and negative plate means, and sensing means electronically connected to the sensing terminal means and delivering a signal linearly responsive to oxygen partial pressure within the gas containing zone comprising oxygen reduction means for withdrawing gaseous oxygen from a gas containing zone in said sealed housing means, said oxygen reduction means consisting of a nickel substrate and a non-porous nickel oxide surface coating entirely covering said substrate and having one major surface in contact with the electrolyte-containing separator means overlying the negative plate, and non-porous hydrophobic polymer film means bonded to and in contact with and entirely covering a remaining major surface of said oxygen reduction means and being exposed to a gas containing zone within said housing means.

2. A rechargeable sealed cell according to claim 1 in which said non-porous hydrophobic polymer film means is a fluorocarbon polymer film.

3. A rechargeable sealed cell according to claim 1 in which said non-porous hydrophobic polymer film means is a polytetrafluoroethylene film.

4. A rechargeable sealed cell according to claim 1, said housing defining an interior chamber containing said positive and negative plate means, said cell having within said housing oxygen recombination electrode means having a major surface contacting said porous separator means in ionically conductive relation with said electrolyte and a remaining major surface exposed to a gas containing zone of said interior chamber.

References Cited

UNITED STATES PATENTS

| | | | |
|---|---|---|---|
| 2,578,027 | 12/1951 | Tichenor | 320—46 |
| 2,842,607 | 7/1958 | Germershausen et al. | 136—6 |
| 2,951,106 | 8/1960 | Reutschi | 136—6 |
| 3,005,943 | 10/1961 | Jaffe | 136—28X |
| 3,080,440 | 3/1963 | Ruetschi et al. | 136—3 |
| 3,096,215 | 7/1963 | Voss et al. | 136—6 |
| 3,276,909 | 10/1966 | Moos | 136—86 |
| 3,350,225 | 10/1967 | Seiger | 136—6 |
| 3,356,533 | 12/1967 | Carson, Jr. | 136—179X |
| 3,462,303 | 8/1969 | Reber | 136—179X |

ALLEN B. CURTIS, Primary Examiner

A. SKAPARS, Assistant Examiner

U.S. Cl. X.R.

136—6, 179, 182